(12) United States Patent
Balm et al.

(10) Patent No.: US 8,736,898 B2
(45) Date of Patent: May 27, 2014

(54) AUTOMATED USER FEEDBACK

(75) Inventors: Andrew K. Balm, St. Albans (GB); Gemma R. Lee, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 1646 days.

(21) Appl. No.: 11/873,523

(22) Filed: Oct. 17, 2007

(65) Prior Publication Data
US 2009/0141302 A1 Jun. 4, 2009

(51) Int. Cl.
*G06F 15/00* (2006.01)
*G06F 17/00* (2006.01)

(52) U.S. Cl.
USPC .......... 358/1.9; 358/1.15; 358/1.16; 358/401; 358/450; 358/474; 715/221

(58) Field of Classification Search
USPC .......... 358/1.12–1.18, 1.1, 1.6, 1.9, 296, 401, 358/405, 474; 382/203, 225, 254, 284, 294; 345/156, 158, 163, 173, 184, 503, 590, 345/591
See application file for complete search history.

(56) References Cited

U.S. PATENT DOCUMENTS

| 5,960,065 | A | * | 9/1999 | Beck et al. ................. 379/93.07 |
| 6,032,004 | A | | 2/2000 | Mirabella, Jr. et al. |
| 7,027,187 | B1 | * | 4/2006 | Zuber ............................ 358/1.9 |
| 2002/0075268 | A1 | | 6/2002 | Hecht et al. |
| 2003/0144904 | A1 | * | 7/2003 | Beckman et al. ............... 705/14 |
| 2005/0255439 | A1 | * | 11/2005 | Cody ............................. 434/353 |
| 2007/0108277 | A1 | | 5/2007 | Garapati et al. |
| 2007/0127693 | A1 | | 6/2007 | D'Ambrosio et al. |

* cited by examiner

*Primary Examiner* — Steven Kau
(74) *Attorney, Agent, or Firm* — Gibb & Riley, LLC

(57) ABSTRACT

A method and printing device print a feedback form in response to activation of a customer feedback option of the printing device. The printing device and the feedback form instruct the user to supply feedback comments on the feedback form and cause the feedback form to be scanned using the printing device. The method and printing device identifying the feedback form in response to the scanning of the feedback form and capture the feedback form as a feedback form image. The method and printing device transmit the feedback form image from the printing device to a feedback collection entity.

20 Claims, 2 Drawing Sheets

AUTOMATED USER FEEDBACK

BACKGROUND AND SUMMARY

Embodiments herein generally relate to systems, methods, services, etc. for obtaining user feedback and provides a simple user interface that causes a form to be printed and an apparatus and method to simply scan and transmit the form (after the user has provided comments) to the appropriate customer service entity.

Embodiments herein utilize a device that includes the ability to print, scan, and communicate with a remote customer service entity. There are many devices currently available that have these abilities, such as copiers, fax machines, multifunction printers, etc., and the embodiments herein are intended to operate with such machines. For example, Xerox Corporation, Stamford Conn., USA, manufactures many copying and printing devices that have the ability to print, scan, fax, and communicate over wired and wireless syndication networks and the detailed workings such devices are not elaborated upon in detail herein, so as to focus the reader on the salient aspects of the present embodiments.

Such printing and copying devices are used by a wide variety of users who have vastly differing needs and expectations of the printing device. These different users can provide very valuable feedback to designers, servicing personnel, managers, quality control supervisors, etc. Indeed, it is common for anecdotal concerns, problems, or issues to be fed back to product development and/or research teams.

However, most feedback systems are cumbersome, require the user to engage in telephonic or electronic chat conversations, or require the user to provide the feedback by mail (land-based mail or e-mail). All these feedback systems require the user to take cumbersome steps using devices and systems that are separate from the printing device upon which feedback is desired. Further, many of these feedback systems require the user to be adept at responding to surveys through purely electronic interfaces (such as filling in the blanks of electronic forms and e-mailing such forms). However, many users of printing devices are not adept at working with purely electronic interfaces. Therefore, such feedback systems are not utilized extensively by users and much valuable feedback information that could potentially improve the quality and/or usefulness of the printing device never reaches product development and/or research teams.

The embodiments of the invention described herein provide a feedback system that is performed exclusively by the printing device about which the feedback is based, and which utilizes a handwritten feedback entry. The feedback system described herein is easily accessible from the normal operating interface of the printing device. In addition, the embodiments herein place the handwritten feedback into an electronic form so that it can be quickly and easily transmitted from the printing device to many departments within the corporation that manufacture the printing device. The embodiments herein do not require extensive use or knowledge of the specific printing device in question, which enables the feedback to be obtained from novice and expert users alike.

Further, because the embodiments disclosed herein utilize handwritten feedback, the users do not need to be adept at working with electronic forms. Some users prefer to provide information in handwritten forms versus electronic forms (especially if the user interface is small and awkward to use-as is sometimes the case with electronic interfaces that are included within printing devices). Also, many times users have idle time while they are waiting for the printing device to finish its printing and/or copying operation and are likely to complete a handwritten feedback form during such idle time (e.g., while they are standing next to the copier waiting for an on-demand copy job to be completed). All these factors of embodiments herein combine to increase the amount of feedback provided from the wide variety of users that operate today's printing devices.

When configured to operate with embodiments herein, such a device includes a feedback button, graphic user interface, or other selector that can be activated by a user when the user decides to provide feedback relating to the device itself. Thus, for example, the printing device configured according to embodiments herein comprises a button, a key, a touch screen, and/or a pointing device which activates the customer feedback option. The feedback option can also be within other menus on the printing device.

The method prints a feedback form in response to activation of the customer feedback option. The printing device and/or the feedback form instruct the user to supply feedback comments on the feedback form that the device printed. Thus, the feedback comments comprise handwritten, hand printed, and/or typed marks on the feedback form. The users are also instructed to scan the feedback form using the device that printed the feedback form after the user supplies feedback comments onto the feedback form. Thus, the embodiments herein cause the feedback form to be scanned using the printing device.

The device can identify the feedback form and distinguish the feedback form from other documents that may be scanned by the printing device in a number of different ways. For example, the user can activate a button, a key, a touch screen, and/or a pointing device on the printing device which directs the printing device to scan the feedback form. Alternatively, the embodiments herein can automatically identify the feedback form in response to scanning of the feedback form. If the feedback form is to be automatically identified, the printing of the feedback form causes the feedback form to include unique markings (such as barcodes or glyphs) that allow the central processing unit to automatically identify the feedback form and distinguish the feedback form from other documents that may be scanned by the printing device.

Thus, the embodiments herein capture the feedback form as a "feedback form image." This image can be stored temporarily or permanently and can also be transmitted from the printing device to a feedback collection entity, which can comprise one or more customer service locations, design centers, quality control centers, etc.

An apparatus embodiment herein includes one or more of the following: a central processing unit; a printing engine operatively connected to the central processing unit; a scanner operatively connected to the central processing unit; a user interface operatively connected to the central processing unit; and an input/output operatively connected to the central processing unit. Again, the graphic user interface comprises a customer feedback option.

The central processing unit is adapted to cause the printing engine to print the feedback form in response to the user activating the customer feedback option. The user interface and/or the feedback form instruct the user to supply feedback comments on the feedback form and to scan the feedback form using the scanner. The central processing unit is adapted to identify (automatically, or according to user input, as discussed above) the feedback form in response to the feedback form being scanned by the scanner and to capture the feedback form as a feedback form image. The central processing unit is also adapted to transmit the feedback form image to a feedback collection entity through the input/output.

As mentioned above, the feedback form can comprise unique markings to allow the central processing unit to automatically identify the feedback form. The user interface can comprise simple buttons, keys, etc. or can comprise a more complex graphic user interface that has menus, one of which can be for selecting the customer feedback option. Thus, the graphic user interface can include a button, a key, a touch screen, and/or a pointing device which activate the customer feedback option. Similarly, the graphic user interface can include a button, a key, a touch screen, and/or a pointing device which directs the scanner to scan the feedback form after the user has supplied the feedback comments on the feedback form.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, embodiments herein provide systems and methods for obtaining user feedback that provide a simple user interface that causes a form to be printed and an apparatus and method to simply scan and transmit the form (after the user has provided comments) to the appropriate customer service entity.

As also mentioned above, such printing and copying devices are used by a wide variety of users who have vastly differing needs and expectations of the printing device. These different users can provide very valuable feedback to designers, servicing personnel, managers, quality control supervisors, etc. Indeed, it is common for anecdotal concerns, problems, or issues to be fed back to product development and/or research teams. However, most feedback systems are cumbersome, require the user to engage in telephonic or electronic chat conversations, or require the user to provide the feedback by mail (land-based mail or e-mail). All these feedback systems require the user to take cumbersome steps using devices and systems that are separate from the printing device upon which feedback is desired.

Therefore, the present embodiments have been created to increase the likelihood that a wide range of users will provide increased amounts of feedback, which can ultimately increase the usefulness and functionality of the printing device. When configured to operate with embodiments herein, such a device includes a feedback button, graphic user interface, or other selector that can be activated by a user when the user decides to provide feedback relating to the device itself. Thus, for example, the printing device configured according to embodiments herein comprises a button, a key, a touch screen, and/or a pointing device which activates the customer feedback option. The feedback option can also be within other menus on the printing device.

Figure 1:
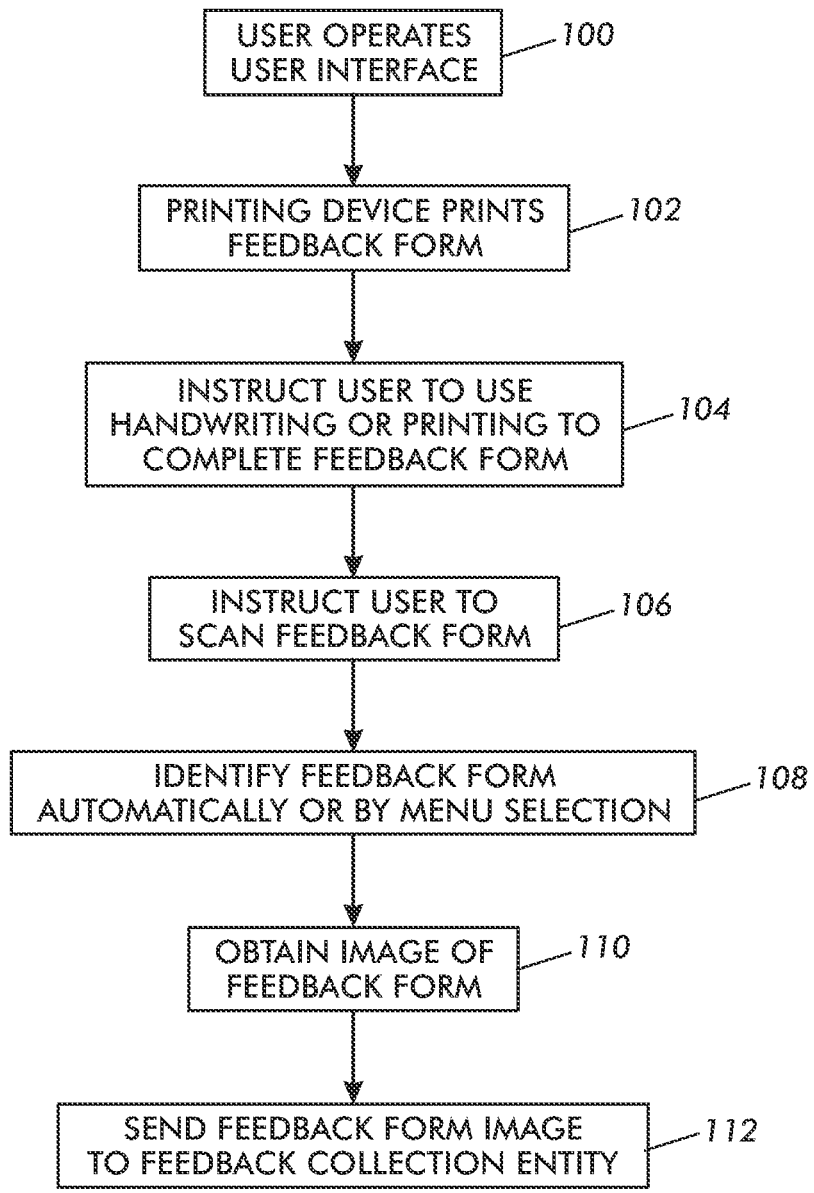
FIG. 1 is a flow diagram illustrating embodiments herein.

As shown in flowchart form in FIG. 1, in response to activation of the customer feedback option by a user operating the user interface on the printing device itself (item 100), the printing device prints a feedback form containing questions and answers spaces designed to elicit feedback from the user (item 102). See U.S. Patent Application 2007/0127693 and the references cited therein (incorporated herein by reference) for general discussions regarding using feedback forms.

In addition to containing questions and answers spaces, the feedback form can also contain instructions to the user to supply handwritten, printed, or typed feedback comments on the feedback form that the device printed (item 104). Alternatively, such instructions can be provided through the user interface of the printing device itself. Thus, the feedback comments can comprise handwritten, hand printed, and/or typed marks on the feedback form. Similarly, the feedback form or the user interface of the printing device can contain instructions to the user to scan the feedback form using the device that printed the feedback form, after the user supplies feedback comments onto the form (item 106). For example, the user can be instructed to place the feedback form in a face up or face down position within the document handler or on the document glass (platen). Thus, the embodiments herein cause the feedback form to be scanned using the printing device that printed the feedback form.

The device can identify the feedback form and distinguish the feedback form from other documents that may be scanned by the printing device in a number of different ways in item 108. For example, the user can activate a button, a key, a touch screen, and/or a pointing device on the printing device which directs the printing device to scan the feedback form. Alternatively, the embodiments herein can automatically identify the feedback form in response to scanning of the feedback form. If the feedback form is to be automatically identified, the printing of the feedback form causes the feedback form to include unique markings (such as barcodes, glyphs, or other markings) that allow the central processing unit to automatically identify the feedback form and distinguish the feedback form from other documents that may be scanned by the printing device. See U.S. Patent Applications 2007/0108277 and 2002/0075268 and the references cited therein (incorporated herein by reference) for general discussions regarding barcodes and glyphs.

Thus, the embodiments herein capture the image of the feedback form as a "feedback form image" in item 110. This image can be stored temporarily or permanently and can also be transmitted (e-mail, facsimile transmission, electronic data file transfer, etc.) from the printing device to a feedback collection entity in item 112, which can comprise one or more customer service locations, design centers, quality control centers, etc. In addition, the method embodiments herein can add identifiers of the printing device including the make, model, serial number, to the data file that holds the feedback form image. Such printing device identifiers can be added to the feedback form image file to appear as printing when the feedback form image file is printed or viewed, and/or such printing device identifiers can be added to the feedback form image file electronically as headers, a file name, text data, etc.

Figure 2:
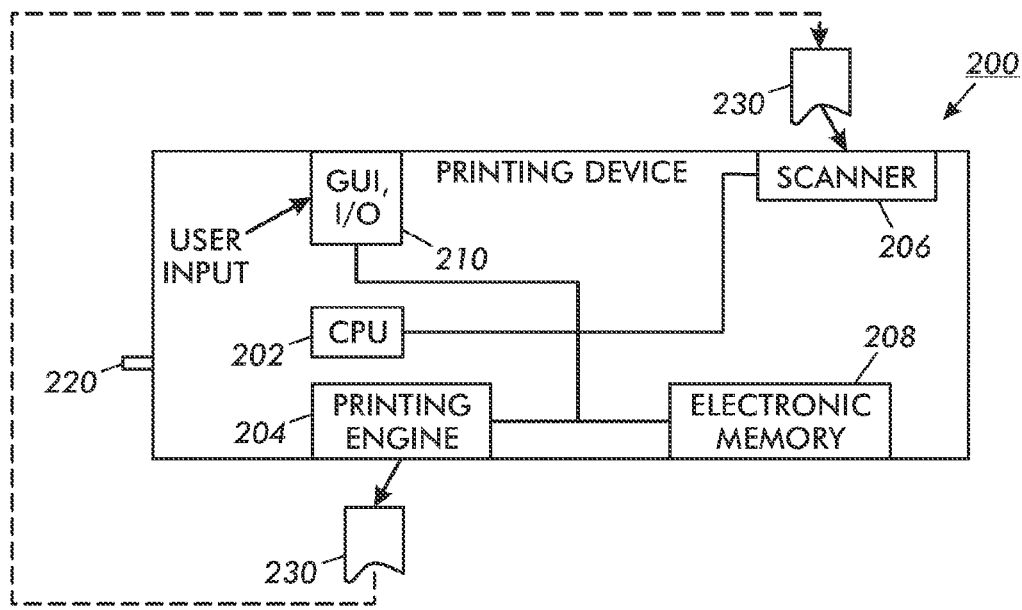
FIG. 2 is a schematic representation of a system embodiment herein.

One example of an apparatus embodiment herein that is illustrated in FIG. 2 is a printing device 200 that includes one or more of the following: a central processing unit 202; a printing engine 204 operatively connected to the central processing unit 202; a scanner 206 operatively connected to the central processing unit 202; a user interface 210 operatively connected to the central processing unit 202; and an input/output 220 operatively connected to the central processing unit 202. Again, the graphic user interface 210 comprises a customer feedback option.

The central processing unit 202 is adapted to cause the printing engine 204 to print the feedback form 230 in response to the user activating the customer feedback option.

The user interface 210 and/or the feedback form 230 instruct the user to supply feedback comments on the feedback form 230 and to scan the feedback form 230 using the scanner 206. The central processing unit 202 is adapted to identify (automatically, or according to user input, as discussed above) the feedback form 230 in response to the feedback form 230 being scanned by the scanner 206 and to capture the feedback form 230 as a feedback form image. The central processing unit 202 is also adapted to transmit the feedback form image to a feedback collection entity and to identify the printing device (by make, model, serial number, etc.) through the input/output.

As mentioned above, the feedback form 230 can comprise unique markings to allow the central processing unit 202 to automatically identify the feedback form 230. The user interface 210 can comprise simple buttons, keys, etc. or can comprise a more complex touch screen or pointing device driven graphic user interface 210 that has menus, one of which can be for selecting the customer feedback option screen. Thus, the graphic user interface 210 can include a button, a key, a touch screen, and/or a pointing device which activate the customer feedback option. Similarly, the graphic user interface 210 can include a button, a key, a touch screen, and/or a pointing device which directs the scanner 206 to scan the feedback form 230 after the user has supplied the feedback comments on the feedback form 230.

Figure 3:
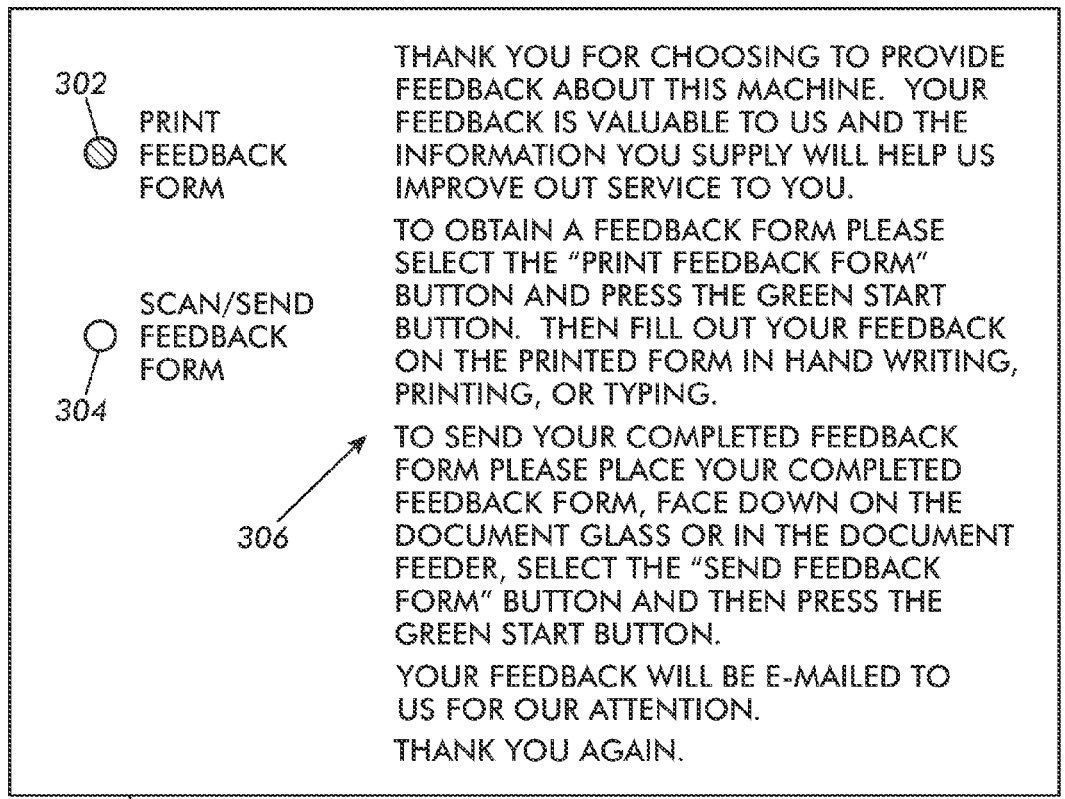
FIG. 3 is a schematic representation of a graphic user interface according to embodiments herein.

One example of a graphic user interface is shown as item 300 in FIG. 3. It includes instructions 306 and a print feedback form button 302 and a scan/send feedback form button 304. One example of the instructions can be: "Thank you for choosing to provide feedback about this machine. Your feedback is valuable to us and the information you supply will help us improve our service to you. To obtain a feedback form please select the "Print Feedback Form" button and press the green Start button. Then fill out your feedback on the printed form in hand writing, printing, or typing. To send your completed feedback form please place your completed feedback form, face down on the document glass or in the document feeder, select the "Send Feedback Form" button and then press the green Start button. Your feedback will be e-mailed to us for our attention. Thank you again." In one embodiment, the user would not be charged for the user of the feedback system. One ordinarily skilled in the art would understand that the user interface 300 illustrated in FIG. 3 is only an example and that any other type of interface could be utilized with embodiments herein.

Many computerized devices are discussed above. Computerized devices that include chip-based central processing units (CPU's), input/output devices, memories, processors, antenna, programmable switches and buttons, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

The word "printer" as used herein encompasses any apparatus, such as a digital copier, bookmaking machine, facsimile machine, multi-function machine, etc. which performs a scanning and print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA. Such printers commonly include input/output, power supplies, processors, media movement devices, marking devices etc., the details of which are omitted herefrom to allow the reader to focus on the salient aspects of the embodiments described herein.

Thus as shown above, the embodiments herein provide a feedback system that is performed exclusively by the printing device (the very printing device that the user is providing feedback about) and which utilizes a handwritten feedback entry. The feedback system described herein is easily accessible from the normal operating interface of the printing device. In addition, the embodiments herein place the handwritten feedback into an electronic form so that it can be quickly and easily transmitted from the printing device to many departments within the corporation that manufactures the printing device. The embodiments herein do not require extensive use or knowledge of the specific printing device in question which enables the feedback to be obtained from novice and expert users alike.

The present embodiments would not be apparent to one ordinarily skilled in the art when the operations of conventional systems are considered because conventional systems require that handwritten paper-based feedback forms be handled on devices that are separate from the device about which the comments are being provided. Thus, conventional devices either print and/or transmit the feedback forms on some device other than the one that is the subject of the feedback (or require the handwritten forms to be mailed). Alternatively, some devices do not utilize handwritten comments. Thus, conventional systems teach away from using handwritten feedback that can be supplied by only using the printing device that is the subject of the feedback comments. One unexpected result of using only the printing device to obtain the handwritten or printed comments is that the users are more likely to provide feedback (because, for example, the ease of providing feedback) and are more likely to provide more details in their feedback (because, for example, they are providing feedback on the printing device concurrently while using the printing device and have greater retention of ideas and comments which otherwise might be lost as time passes). Another unexpected result is that, with embodiments herein, the printing device is always identified correctly (when the printing device identifiers are added to the feedback form image data file) which overcomes a common problem of users not correctly identifying the device upon which they wish to provide feedback comments.

Further, because the embodiments disclosed herein utilize handwritten feedback, the users do not need to be adept at working with electronic forms. Some users prefer to provide information in handwritten forms versus electronic forms (especially if the user interface is small and awkward to use-as is sometimes the case with electronic interfaces that are included within printing devices). Also, many times users have idle time while they are waiting for the printing device to finish its printing and/or copying operation and are likely to complete a handwritten feedback form during such idle time. All these factors combine to increase the amount of feedback provided from the wide variety of users that operate today's printing devices.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. An apparatus comprising:
a central processing unit;
a printing engine operatively connected to said central processing unit;
a scanner operatively connected to said central processing unit;
a user interface operatively connected to said central processing unit; and
an input/output operatively connected to said central processing unit,
wherein said user interface comprises a customer feedback option,
wherein said central processing unit is adapted to cause said printing engine to print a printed feedback form in response to a user activating said customer feedback option on said user interface,
wherein at least one of said user interface and said printed feedback form instruct said user to supply feedback comments on said printed feedback form and to scan said printed feedback form using said scanner,
wherein said central processing unit is adapted to capture said printed feedback form as a feedback form image in response to said printed feedback form being scanned by said scanner, and
wherein said central processing unit is adapted to transmit said feedback form image to a feedback collection entity through said input/output.

2. The apparatus according to claim 1, wherein said feedback comments comprise at least one of handwritten, hand printed, and typed marks on said printed feedback form.

3. The apparatus according to claim 1, wherein said user interface further comprises menus for selecting said customer feedback option.

4. The apparatus according to claim 1, wherein said user interface further comprises at least one of a button, a key, a touch screen, and a pointing device which activate said customer feedback option.

5. The apparatus according to claim 1, wherein said user interface further comprises at least one of a button, a key, a touch screen, and a pointing device which directs said scanner to scan said printed feedback form after said user has supplied said feedback comments on said printed feedback form.

6. An apparatus comprising:
a central processing unit;
a printing engine operatively connected to said central processing unit;
a scanner operatively connected to said central processing unit;
a graphic user interface operatively connected to said central processing unit; and
an input/output operatively connected to said central processing unit,
wherein said graphic user interface comprises a customer feedback option,
wherein said central processing unit is adapted to cause said printing engine to print a printed feedback form in response to a user activating said customer feedback option on said graphic user interface,
wherein at least one of said graphic user interface and said printed feedback form instruct said user to supply feedback comments on said printed feedback form and to scan said printed feedback form using said scanner,
wherein said central processing unit is adapted to automatically identify said printed feedback form in response to said printed feedback form being scanned by said scanner and to capture said printed feedback form as a feedback form image, and
wherein said central processing unit is adapted to transmit said feedback form image to a feedback collection entity through said input/output.

7. The apparatus according to claim 6, wherein said printed feedback form comprises unique markings to allow said central processing unit to automatically identify said printed feedback form.

8. The apparatus according to claim 6, wherein said graphic user interface further comprises menus for selecting said customer feedback option.

9. The apparatus according to claim 6, wherein said graphic user interface further comprises at least one of a button, a key, a touch screen, and a pointing device which activate said customer feedback option.

10. The apparatus according to claim 6, wherein said graphic user interface further comprises at least one of a button, a key, a touch screen, and a pointing device which directs said scanner to scan said printed feedback form after said user has supplied said feedback comments on said printed feedback form.

11. A method comprising:
printing a printed feedback form in response to activation of a customer feedback option of a printing device, wherein at least one of said printing device and said printed feedback form instruct said user to supply feedback comments on said printed feedback form on a graphic user interface,
causing said printed feedback form to be scanned using said printing device; capturing said printed feedback form as a feedback form image, and transmitting said feedback form image from said printing device to a feedback collection entity.

12. The method according to claim 11, wherein said feedback comments comprise at least one of handwritten, hand printed, and typed marks on said printed feedback form.

13. The method according to claim 11, further comprising providing menus on said printing device for selecting said customer feedback option.

14. The method according to claim 11, further comprising providing, on said printing device, at least one of a button, a key, a touch screen, and a pointing device which activate said customer feedback option.

15. The method according to claim 11, further comprising providing, on said printing device, at least one of a button, a key, a touch screen, and a pointing device which directs said printing device to scan said printed feedback form after said user has supplied said feedback comments on said printed feedback form.

16. A method comprising:
printing a printed feedback form in response to activation of a customer feedback option of a printing device, wherein at least one of said printing device and said printed feedback form instruct said user to supply feedback comments on said printed feedback form on a graphic user interface,
causing said printed feedback form to be scanned using said printing device;
automatically identifying said printed feedback form in response to scanning of said printed feedback form;

capturing said printed feedback form as a feedback form image, and transmitting said feedback form image from said printing device to a feedback collection entity.

17. The method according to claim 16, wherein said printing of said printed feedback form causes said printed feedback form to comprise unique markings that allow said central processing unit to automatically identify said printed feedback form.

18. The method according to claim 16, further comprising providing, on said printing device, at least one of a button, a key, a touch screen, and a pointing device which activate said customer feedback option.

19. The method according to claim 16, further comprising providing, on said printing device, at least one of a button, a key, a touch screen, and a pointing device which directs said printing device to scan said printed feedback form after said user has supplied said feedback comments on said printed feedback form.

20. A non-transitory computer program product comprising:

a computer-usable data carrier storing instructions that, when executed by a computer, cause said computer to perform a method comprising:

printing a printed feedback form in response to activation of a customer feedback option of a printing device, wherein at least one of said printing device and said printed feedback form instruct said user to supply feedback comments on said printed feedback form on a graphic user interface, causing said printed feedback form to be scanned using said printing device; capturing said printed feedback form as a feedback form image, and transmitting said feedback form image from said printing device to a feedback collection entity.

* * * * *